US012573961B2

(12) United States Patent
Yeon

(10) Patent No.: US 12,573,961 B2
(45) Date of Patent: Mar. 10, 2026

(54) APPARATUS AND METHOD FOR CONSTANT MAGNITUDE OUTPUT VOLTAGE IN WIRELESS COMMUNICATION SYSTEM

(71) Applicant: Samsung Electronics Co., Ltd., Suwon-si (KR)

(72) Inventor: Cheolo Yeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 18/314,422

(22) Filed: May 9, 2023

(65) Prior Publication Data

US 2023/0361686 A1 Nov. 9, 2023

Related U.S. Application Data

(63) Continuation of application No. PCT/KR2022/020762, filed on Dec. 20, 2022.

(30) Foreign Application Priority Data

Dec. 27, 2021 (KR) ......................... 10-2021-0188782
Jan. 19, 2022 (KR) ......................... 10-2022-0007527

(51) Int. Cl.
H02M 3/335 (2006.01)
(52) U.S. Cl.
CPC ... H02M 3/33573 (2021.05); H02M 3/33576 (2013.01)
(58) Field of Classification Search
CPC ......... H02M 3/33573; H02M 3/33576; H02M 1/0048; H02M 3/33569; H02M 3/33571;
(Continued)

(56) References Cited

U.S. PATENT DOCUMENTS 6,343,027 B1 1/2002 Kerwin
6,710,646 B1 3/2004 Kimball
(Continued)

FOREIGN PATENT DOCUMENTS

CN 101454957 A 6/2009
CN 101951159 A 1/2011
(Continued)

OTHER PUBLICATIONS

Kline et al., "Capacitive Power Transfer for Contactless Charging", University of California Berkeley, 978-1-4244-8083-8/11, Aug. 2011 IEEE, pp. 1398-1404.
(Continued)

*Primary Examiner* — Yuwen Pan
(74) *Attorney, Agent, or Firm* — Jefferson IP Law, LLP

(57) ABSTRACT

The disclosure relates to a fifth-generation (5G) or pre-5G communication system to support a higher data transmission rate beyond that of a fourth-generation (4G) communication system, such as Long-Term Evolution (LTE). According to embodiments of the disclosure. An apparatus and method in a wireless communication system are provided. The apparatus includes a full-bridge inverter configured to convert an input first direct current (DC) signal into a first alternating current (AC) signal, a plurality of multilayer ceramic capacitors (MLCCs) configured to isolate the first AC signal output from the full-bridge inverter to output a second AC signal, and a full-bridge rectifier configured to convert the second AC signal output from the plurality of MLCCs into a second DC signal. The plurality of MLCCs isolate the full-bridge inverter from the full-bridge rectifier, an inductor is connected to one end of each of the plurality of MLCCs, and an operating frequency of the first AC signal corresponds to a resonant frequency.

19 Claims, 15 Drawing Sheets

(58) Field of Classification Search
CPC ........ H02M 1/007; H02M 3/158; H01G 4/12; H01G 4/38; H01G 4/40; H01G 4/30; H02J 50/05
See application file for complete search history.

(56) References Cited

U.S. PATENT DOCUMENTS

| | | | |
|---|---|---|---|
| 7,969,045 B2 | 6/2011 | Schmidt et al. | |
| 9,893,627 B1 | 2/2018 | Telefus et al. | |
| 10,340,805 B2 | 7/2019 | Kovacevic et al. | |
| 10,917,017 B1 * | 2/2021 | McFarland | H02M 3/3376 |
| 10,998,823 B2 | 5/2021 | Raymond et al. | |
| 2006/0061338 A1 | 3/2006 | Keller | |
| 2006/0164868 A1 | 7/2006 | Weber | |
| 2015/0311793 A1 * | 10/2015 | Khayat | H02M 3/158 |
| | | | 323/271 |
| 2015/0326033 A1 | 11/2015 | Ichikawa et al. | |
| 2017/0244318 A1 * | 8/2017 | Giuliano | H02M 3/07 |
| 2020/0287413 A1 | 9/2020 | Peretz | |
| 2021/0099017 A1 | 4/2021 | Parnell | |
| 2021/0183586 A1 * | 6/2021 | Yoshida | H01G 9/055 |
| 2024/0006930 A1 * | 1/2024 | Li | H02M 3/04 |
| 2025/0070679 A1 * | 2/2025 | Tomioka | H02M 1/36 |
| 2025/0167690 A1 * | 5/2025 | Wang | H02M 3/33584 |

FOREIGN PATENT DOCUMENTS

| | | | |
|---|---|---|---|
| CN | 105934876 A | 9/2016 | |
| CN | 112600456 A | 4/2021 | |
| CN | 111987780 B | 4/2022 | |
| CN | 111224471 B | 12/2023 | |
| EP | 2169817 A1 | 3/2010 | |
| KR | 10-2016-0111468 A | 9/2016 | |
| KR | 10-2019-0133979 A | 12/2019 | |
| WO | 2015/110427 A1 | 7/2015 | |
| WO | 2016/161280 A1 | 10/2016 | |
| WO | 2016/179329 A1 | 11/2016 | |

OTHER PUBLICATIONS

Antivachis et al., "Analysis of capacitive power transfer GaN ISOP multi-cell DC/DC converter systems for single-phase telecom power supply module", Zurich, Switzerland, 978-1-5090-3474-1/16, Jan. 2016 IEEE, pp. 1280-1287.

Koki et al., "Proposal of isolated outlet socket and plug using capacitive power transfer," Tochigi , Japan, 978-1-5090-5157-1/17, Jan. 2017 IEEE, pp. 648-653.

International Search Report and written opinion dated on Apr. 3, 2023, issued in International Patent Application No. PCT/KR2022/ 020762.

Extended European Search Report dated Dec. 16, 2024, issued in European Application No. 22916582.4-1002.

Mishra et al.; Power transfer using portable surfaces in capacitively coupled power transfer technology; IET Power Electronics, IET, vol. 9, No. 5, pp. 997-1008, XP006056320, Apr. 20, 2016, UK.

Ryu et al.; Contactless Interconnect Circuit Design for Automotive CAN Communication; 2021 International conference on Information and Communication Technology Convergence (ICTC), IEEE, pp. 65-68, XP034038654, Oct. 20, 2021.

Sreyam et al.; Active variable reactance rectifier; 2017 IEEE 18th Workshop on Control and Modeling for Power Electronics (COM-PEL), IEEE, pp. 1-8, XP033144096, Jul. 9, 2017.

Korean Office Action dated Jan. 5, 2026, issued in Korean Patent Application No. 10-2022-0007527.

* cited by examiner

820

Capactive Isolation Area

APPARATUS AND METHOD FOR CONSTANT MAGNITUDE OUTPUT VOLTAGE IN WIRELESS COMMUNICATION SYSTEM

CROSS-REFERENCE TO RELATED APPLICATION(S)

This application is a continuation application, claiming priority under § 365(c), of an International application No. PCT/KR2022/020762, filed on Dec. 20, 2022, which is based on and claims the benefit of a Korean patent application number 10-2021-0188782, filed on Dec. 27, 2021, in the Korean Intellectual Property Office, and of a Korean patent application number 10-2022-0007527, filed on Jan. 19, 2022, in the Korean Intellectual Property Office, the disclosure of each of which is incorporated by reference herein in its entirety.

TECHNICAL FIELD

The disclosure relates to a wireless communication system. More particularly, the disclosure relates to an apparatus and a method for a constant-magnitude output voltage in a wireless communication system.

BACKGROUND ART

To meet a demand on wireless data traffic which has been in an increasing trend after a 4th generation (4G) communication system was commercialized, there is an ongoing effort to develop an improved 5th generation (5G) communication system or a pre-5G communication system. For this reason, the 5G communication system or the pre-5G communication system is called a beyond 4G network communication system or a post long term evolution (LTE) system.

To achieve a high data transfer rate, the 5G communication system is considered to be implemented in an mmWave band (e.g., such as a 28 GHz, 39 GHz band). To reduce a propagation path loss at the mmWave band and to increase a propagation transmission distance, beamforming, massive multiple input multiple output (MIMO), full dimensional MIMO (FD-MIMO), array antenna, analog beamforming, and large scale antenna techniques are under discussion in the 5G communication system.

In addition, to improve a network of a system, techniques such as an evolved small cell, an advanced small cell, a cloud radio access network (RAN), an ultra-dense network, device to device (D2D) communication, a wireless backhaul, a moving network, cooperative communication, coordinated multi-points (CoMP), and reception interference cancellation, or the like are being developed in the 5G communication system.

In addition thereto, hybrid frequency shift keying and quadrature amplitude modulation (FQAM) and sliding window superposition coding (SWSC) as an advanced coding modulation (ACM) technique and filter bank multi carrier (FBMC), non orthogonal multiple access (NOMA), and sparse code multiple access (SCMA), or the like as an advanced access technology are being developed in the 5G system.

As a required system capacity increases in a wireless communication system, a method for reducing an amount of heat generation and a size of a printed circuit board (PCB) is required.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an apparatus and a method for reducing an amount of heat generation and a size of a printed circuit board (PCB) in a circuit for a constant-magnitude output voltage in a wireless communication system.

Another aspect of the disclosure is to provide an apparatus and a method for reducing a volume of a power circuit and a size of a printed circuit board (PCB) by performing isolation based on multilayer ceramic capacitors (MLCCs) in a circuit for a constant-magnitude output voltage in a wireless communication system.

Another aspect of the disclosure is to provide an apparatus and a method for reducing the volume of a power circuit and the size of a printed circuit board (PCB) by performing isolation based on resonance of an MLCC and an inductor in a circuit for a constant-magnitude output voltage in a wireless communication system.

Additional aspects will be set forth in part in the description which follows and, in part, will be apparent from the description, or may be learned by practice of the presented embodiments.

Technical Solution

In accordance with an aspect of the disclosure, an apparatus in a wireless communication system is provided. The apparatus may include a full-bridge inverter configured to convert an input first direct current (DC) signal into a first alternating current (AC) signal, a plurality of multilayer ceramic capacitors (MLCCs) configured to isolate the first AC signal output from the full-bridge inverter to output a second AC signal, and a full-bridge rectifier configured to convert the second AC signal output from the plurality of MLCCs into a second DC signal, wherein the plurality of MLCCs may isolate the full-bridge inverter from the full-bridge rectifier, an inductor may be connected to one end of each of the plurality of MLCCs, and an operating frequency of the first AC signal may correspond to a resonant frequency.

In accordance with another aspect of the disclosure, a method in a wireless communication system is provided. The method may include converting an input first DC signal into a first AC signal, based on a full-bridge inverter, isolating the first AC signal output from the full-bridge inverter to output a second AC signal, based on a plurality of multilayer ceramic capacitors (MLCCs), and converting the second AC signal output from the plurality of MLCCs into a second DC signal, based on a full-bridge rectifier, wherein the plurality of MLCCs may isolate the full-bridge inverter from the full-bridge rectifier, an inductor may be connected to one end of each of the plurality of MLCCs, and an operating frequency of the first AC signal may correspond to a resonant frequency.

Advantageous Effects

An apparatus and a method according to embodiments of the disclosure may perform isolation based on multilayer ceramic capacitors (MLCCs) in a circuit for a constant-magnitude output voltage, thereby reducing the volume of a power circuit and efficiently reducing the size of a printed circuit board (PCB).

An apparatus and a method according to embodiments of the disclosure enable the volume of a power circuit to be efficiently reduced and the size of a PCB to be efficiently reduced, based on resonance of an MLCC and an inductor.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
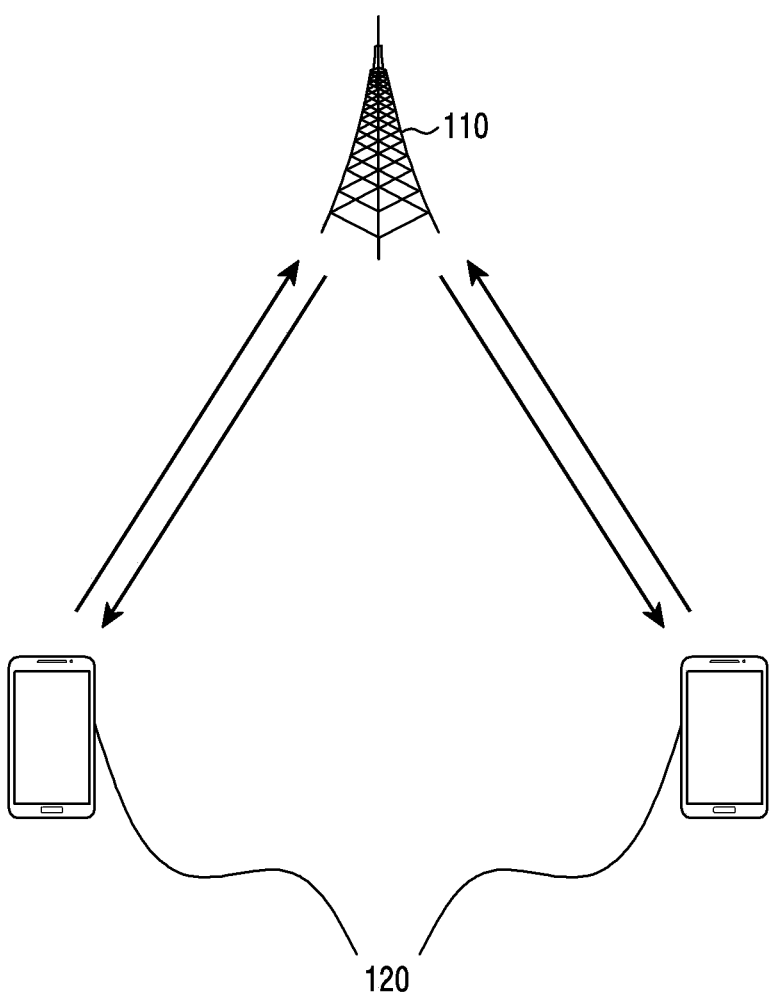
FIG. 1A illustrates a wireless communication system according to an embodiment of the disclosure.

FIG. 1A illustrates a wireless communication system according to an embodiment of the disclosure. A wireless communication environment of FIG. 1A includes a base station 110 and at least one terminal 120 as some of nodes using a wireless channel.

The base station 110 is a network infrastructure that provides wireless access for the at least one terminal 120. The base station 110 has coverage defined as a certain geographic area based on a distance over which the base station 110 may transmit a signal. The base station 110 may be referred to as a massive multiple-input multiple-output (MIMO) unit (MMU), an access point (AP), an evolved Node B (eNodeB, eNB), a 5th-generation (5G) node, a 5G NodeB (NB), a wireless point, a transmission/reception point (TRP), an access unit, a distributed unit (DU), a radio unit (RU), a remote radio head (RRH), or other terms with equivalent technical meanings in addition to a base station. The base station 110 may transmit a downlink signal, or may receive an uplink signal.

The at least one terminal 120 is a device used by a user and communicates with the base station 110 through a wireless channel. In some cases, the at least one terminal 120 may be operated without a user's involvement. That is, the at least one terminal 120 may be a device performing machine-type communication (MTC), and might not be carried by a user. Each of the at least one terminal 120 may be referred to as user equipment (UE), a mobile station, a subscriber station, customer premises equipment (CPE), a remote terminal, a wireless terminal, an electronic device, a vehicular terminal, a user device, or other terms with equivalent technical meanings in addition to a terminal.

Figure 1B:
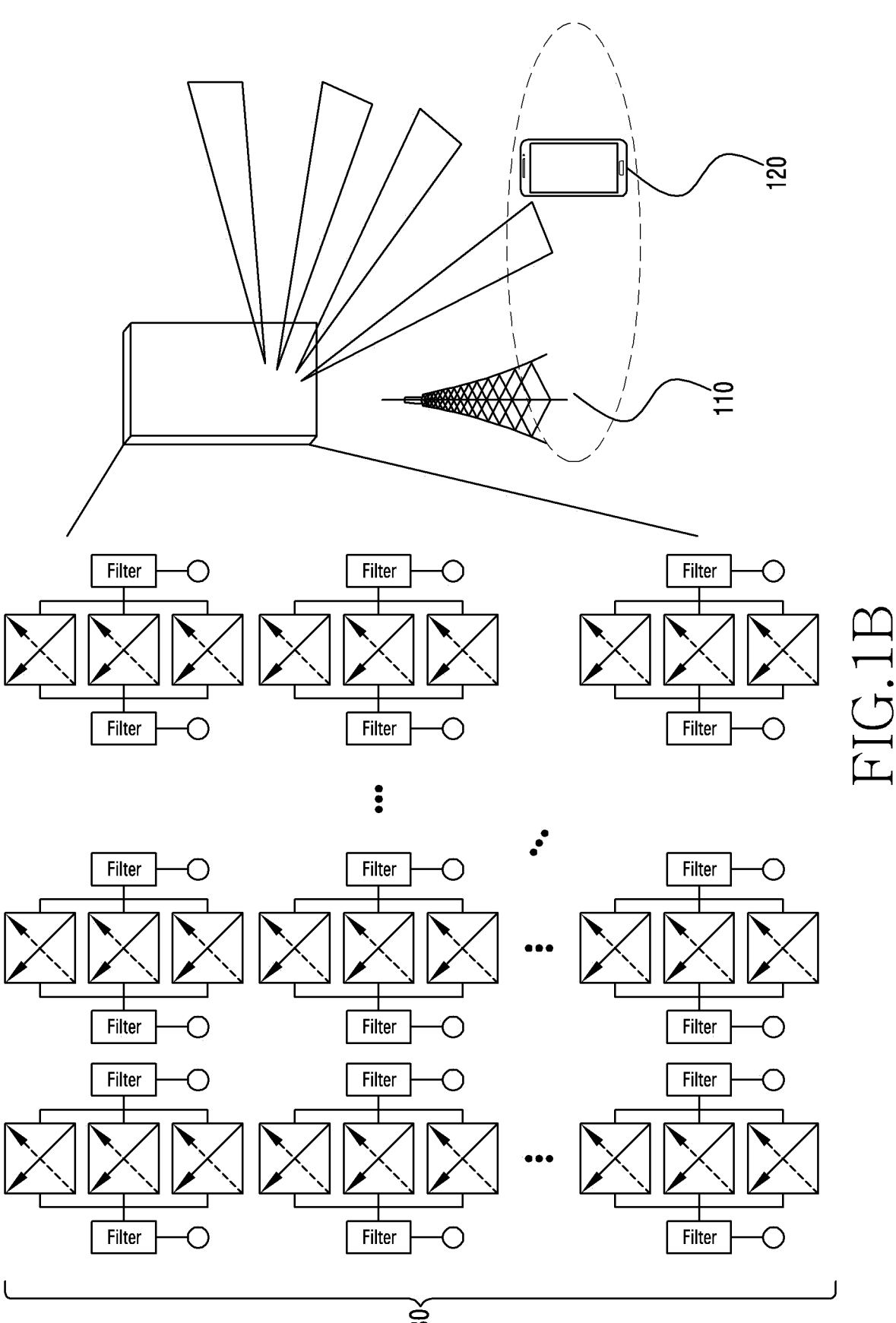
FIG. 1B illustrates an example of an antenna array in a wireless communication system according to an embodiment of the disclosure.

FIG. 1B illustrates an example of an antenna array in a wireless communication system according to an embodiment of the disclosure.

Beamforming is used as one technique for alleviating propagation path loss and increasing the transmission distance of radio waves. Generally, beamforming concentrates radio waves to arrive on an area by using a plurality of antennas or increases directivity in reception for a particular direction. Accordingly, the base station may include a plurality of antennas to form beamforming coverage instead of using a single antenna to form a signal in an isotropic pattern. Hereinafter, an antenna array including a plurality of antennas is described. The example of the antenna array illustrated in FIG. 1B is merely for describing embodiments of the disclosure, and is not construed as limiting other embodiments of the disclosure.

Referring to FIG. 1B, the base station 110 may include the antenna array 130. According to an embodiment, the base station 110 may include a massive MIMO unit (MMU) including the antenna array 130. Each antenna included in the antenna array 130 may be referred to as an array element or an antenna element. FIG. 1B illustrates a two-dimensional planar array as that the antenna array 130, which is only for illustration and does not limit other embodiments of the disclosure. According to another embodiment, the antenna array 130 may be configured in various forms, such as a linear array. The antenna array may be referred to as a massive antenna array.

A radio frequency (RF) filter may include a circuit that performs filtering to transmit a radio signal of a desired frequency by forming resonance. That is, the RF filter may perform a function of selectively identifying a frequency. The RF filter is an important component to select and attenuate a frequency, and is used in most communication devices. Although there are filters advantageous in miniaturization, such as a ceramic filter and a bulk acoustic wave (BAW) filter, a cavity filter has excellent performance in power handling, capacity/insertion loss/attenuation and is thus used in a large number of communication devices. Even though a ceramic filter and a BAW filter may be used for an MMU/small cell requiring a low-output specification, a cavity filter is continuously required to be used for a high-performance MMU and any remote radio unit (RRUs). Therefore, miniaturization/light weight and unit cost of a cavity filter are very important factors in securing competitiveness of communication devices.

A major technology for improving data capacity in 5G communication is beamforming using an antenna array connected to a plurality of RF paths. For a higher data capacity, the number of RF paths needs to be increased or power per RF path needs to be increased. Increasing the number of RF paths increases the size of a product and causes space constraints in actually installing a base station device, thus making it currently impossible to increase the number of RF paths. To increase an antenna gain through high output without increasing the number of RF paths, a plurality of antenna elements may be connected using a splitter (or divider) on RF paths, thereby increasing the antenna gain.

To increase communication performance, the number of antennas (or antenna elements) of a device (e.g., the base station 110) performing wireless communication increases. Further, the number of RF components (e.g., an amplifier and a filter) for processing an RF signal received or transmitted through an antenna element and components also increases, a spatial gain and cost efficiency are essentially required while satisfying communication performance in configuring a communication device. As the number of paths increases, the number of RF components (e.g., an amplifier and a filter) for processing a signal in each antenna element and components also increases.

Figure 2:
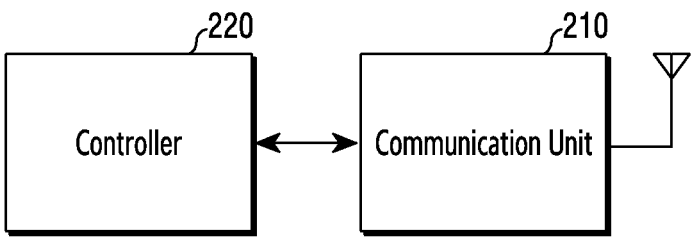
FIG. 2 illustrates a transmission device according to an embodiment of the disclosure.

FIG. 2 illustrates a transmission device according to an embodiment of the disclosure.

The transmission device illustrated in FIG. 2 may be understood as various types of devices. For example, the transmission device of FIG. 2 may be understood as a part of a base station performing wireless communication or a terminal (e.g., user equipment (UE)).

Referring to FIG. 2, the transmission device includes a communication unit 210 and a controller 220.

The communication unit 210 performs functions for transmitting or receiving a signal through a wireless channel. For example, the communication unit 210 performs a function of conversion between a baseband signal and a bit stream according to the physical layer specification of a system. For example, in data transmission, the communication unit 210 encodes and modulates a transmitted bit stream to generate complex symbols. Further, in data reception, the communication unit 210 demodulates and decodes a baseband signal to reconstruct a received bit stream.

The communication unit 210 upconverts a baseband signal into a radio-frequency (RF) band signal, and may transmit the RF band signal through an antenna. The communication unit 210 down converts an RF band signal, received through the antenna, into a baseband signal. To this end, the communication unit 210 may include a transmission filter, a reception filter, an amplifier, a mixer, an oscillator, a digital-to-analog converter (DAC), an analog-to-digital converter (ADC), or the like. Further, the communication unit 210 may include a plurality of transmission/reception paths. In addition, the communication unit 210 may include at least one antenna array including a plurality of antenna elements.

From the aspect of hardware, the communication unit 210 may include a digital unit and an analog unit, and the analog unit may include a plurality of sub-units according to operating power, operating frequency, or the like. The digital unit may be configured as at least one processor (e.g., a digital signal processor (DSP)).

As described above, the communication unit 210 transmits and receives a signal. Accordingly, part or the entirety of the communication unit 210 may be referred to as a transmitter, a receiver, or a transceiver. In the following description, transmission and reception performed through a wireless channel are construed as including processing performed as above by the communication unit 210.

The controller 220 controls overall operations of the transmission device. For example, the controller 220 transmits and receives a signal through the communication unit 210. To this end, the controller 220 may include at least one processor. According to various embodiments, the controller 220 may control the transmission device to perform operations according to various embodiments to be described later.

Figure 3:
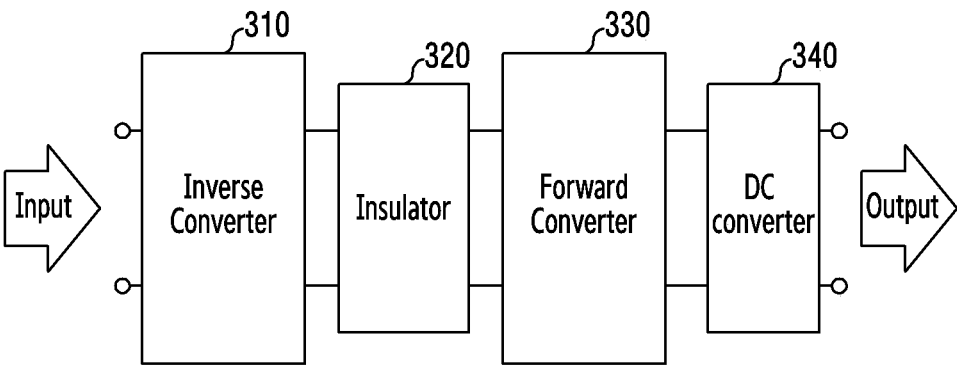
FIG. 3 illustrates a configuration of a circuit for a constant-magnitude output voltage in a wireless communication system according to an embodiment of the disclosure.

FIG. 3 illustrates a configuration of a circuit for a constant-magnitude output voltage in a wireless communication system according to an embodiment of the disclosure.

The terms "unit," "-or/er," and the like used herein indicate a unit for processing at least one function or operation, which may be configured as hardware, software, or a combination thereof. FIG. 3 may be understood as a part of the communication unit 210 or a part of the controller 220.

Referring to FIG. 3, the circuit may include an inverter 310, an isolator 320, a rectifier 330, and a DC-DC converter 340. According to another embodiment, among the inverter 310, the isolator 320, the rectifier 330, and the DC-DC converter 340, the DC-DC converter 340 may be excluded.

The inverter 310 may convert an input DC signal into an AC signal to output the AC signal. The inverter 310 may include a full-bridge inverter. Specifically, the inverter 310 may include a plurality of switches, and each switch may include a diode and a capacitor. The inverter 310 may be connected to the isolator 320. A voltage corresponding to the input DC signal may be in a range of −36 V to −60 V, which is a voltage range of a general communication system.

The isolator 320 may electrically separate an input side and an output side. Specifically, the isolator 320 may electrically isolate the inverter 310 from the rectifier 330 from the isolator. The isolator 320 may be divided into a primary-side isolator and a secondary-side isolator, based on an isolated part, the primary-side isolator may be connected to the inverter 310, and the secondary-side isolator may be connected to the rectifier 330. The isolator 320 may include an inductor and a capacitor. The capacitor may be a multi-layer ceramic capacitor (MLCC). Specifically, the isolator 320 may be an MLCC as a type of capacitor, and may electrically separate the primary-side isolator and the secondary-side isolator. According to an embodiment, an isolation standard between the primary-side isolator and the secondary-side isolator may be 1 kV or more.

According to an embodiment, the isolator 320 may include the inductor. The inductor may be connected to the MLCC so that a resonant frequency $\varphi_0$ may be obtained at a specific frequency. For example, in the MLCC to which the inductor is connected, since a voltage gain is 1 at the resonant frequency, the voltage of the secondary-side isolator may be the same as the voltage of the primary-side isolator.

The rectifier 330 may convert an AC signal output from the secondary-side isolator of the isolator 320 into a DC signal to output the DC signal. The rectifier 330 may include a full-bridge rectifier. Specifically, the rectifier 330 may include a plurality of switches, and each switch may include a diode and a capacitor. Further, the rectifier 330 may include a capacitor for smoothing. Specifically, the rectifier 330 may smooth a signal output from the full-bridge rectifier. The rectifier 330 may be connected to the DC-DC converter 340.

The DC-DC converter 340 may reduce and output the voltage of a DC signal output from the rectifier 330 for a constant-magnitude output voltage. The DC-DC converter 340 may include a buck converter, a boost converter, or a buck-boost converter. Specifically, the DC-DC converter 340 may include a plurality of switches, and each switch may include a diode and a capacitor. Further, the DC-DC converter 340 may include an inductor and a capacitor for smoothing. Specifically, the DC-DC converter 340 may smooth a signal output from the full-bridge rectifier.

Although the disclosure explains that the DC-DC converter 340 reduces and outputs the voltage of the DC signal, the DC-DC converter 340 may increase and output the voltage of the DC signal. For example, the voltage of a DC signal output from the DC-DC converter 340, which corresponds to the constant-magnitude output voltage, may be 28 V or 48 V. When a voltage input to the inverter 310 is lower than 28 V or 48 V, the DC-DC converter 340 may increase and output the voltage accordingly.

To increase communication performance, the number of antennas (or antenna elements) of a device (e.g., the base station 110) performing wireless communication increases. Further, the number of RF components (e.g., an amplifier and a filter) for processing an RF signal received or transmitted through an antenna element and components also increases, a spatial gain and cost efficiency are essentially required while satisfying communication performance in configuring a communication device. As the number of RF components for processing an RF signal received or transmitted through an antenna element and components increases, a required system capacity increases. As the required system capacity increases, a circuit design capacity also increases. For example, the design capacity has been increased from 500 to 700 W/48 V to 1000 to 1200 W/48 V.

When isolation is performed using a transformer, a transformer satisfying the increased design capacity may generate a large amount of heat and may have a large size. The transformer may transfer energy from a primary side to a secondary side by using electromagnetic induction. When energy is transferred, there may be energy that fails to be fully transferred to the secondary side, which is equivalently expressed as leakage inductance. Due to this leakage inductance, a circuit may have unwanted noise or may need to have a design margin, and loss of the transformer itself may increase. Further, since the transformer is configured in a form of winding a wire, the increased capacity may increase conduction loss of the internal wire of the transformer, and consequently the transformer may be designed with an increased size. The conduction loss occurring may be determined based on Equation 1 below.

$$P_{loss} = I^2 R \qquad \text{Equation 1}$$

Here, $P_{loss}$ may denote power loss, I may denote a current flowing in the transformer, and R may denote a parasitic resistance in the transformer. Due to the increased design capacity, the conduction loss occurring inside the transformer may increase according to Equation 1. For example, when the value of the current flowing in the transformer increases by two times, the power loss may increase by four times according to Equation 1. According to an embodiment, when the power loss increases, the amount of heat generation may increase in proportion thereto. The increased design capacity may increase the amount of heat generation. The increased amount of heat generation may cause a serious quality problem. For example, each peripheral component of the circuit has a limiting temperature range. When the temperature rises beyond the limiting temperature range of the component due to the increase in the amount of heat generation, a serious quality problem may occur.

To dissipate the increased amount of heat generation, a method for reducing power loss of each element may be considered. For example, a method for reducing the parasitic resistance of the transformer may be considered. Specifically, a method for reducing the resistance by increasing the size of the transformer and increasing the thickness of the wire inside the transformer may be considered. According to an embodiment, when the size of the transformer is increased, the height of the transformer may increase. According to an embodiment, the height of the RF component and components may be determined according to the height of the transformer. For example, a continuous increase in the height may directly affect the volume of the product, such as the height of the RF component and the components. An increase in the height of the RF component and the components may cause a design problem. For example, although a digital unit (DU) system may be limited to a height of 15 mm, the DU system requires a height of 18 mm according to the company's registered standard for a transformer in order to realize a design capacity of 1000 W/48V.

In order to address the issues of the increase in the amount of heat generation and the increase in the size of the transformer, a different isolation method may be considered instead of the transformer. According to an embodiment, an isolation method using an MLCC, which is one of capacitors, may be considered. MLCCs may be arranged in parallel, and a current may be distributed to the MLCCs arranged in parallel. Since the current is distributed to each of the MLCCs arranged in parallel, the size of a printed circuit board (PCB) may be reduced. For example, an additional MLCC may be attached to an existing MLCC, thereby connecting the additional MLCC in parallel. According to an embodiment, when the MLCCs are arranged in parallel, the current may be determined based on Equation 2.

$$I = I_1 + I_2 + I_3 + \ldots \qquad \text{Equation 2}$$

Here, I denotes a total current, $I_1$ denotes a current of the existing MLCC, and $I_2$ and $I_3$ denote a current flowing in respective MLCCs additionally attached to the existing MLCC. Specifically, the isolating MLCCs may be arranged in parallel, and thus a current flowing in each MLCC may be reduced. As above in Equation 1, power loss is proportional to a parasitic resistance inside the MLCC and the square of the magnitude of the current flowing to each MLCC. Specifically, an isolator using the MLCCs may distribute the flowing current, thus reducing the amount of heat generation by each component. When a capacity is increased, MLCCs are designed to be simply added in parallel without needing to increase the size of the component itself as in the transformer. Accordingly, the printed circuit board (PCB) does not need to be designed large. Therefore, the overall size of a power circuit may be reduced with the isolator using the MLCCs compared to the isolator using the transformer.

Figure 4:
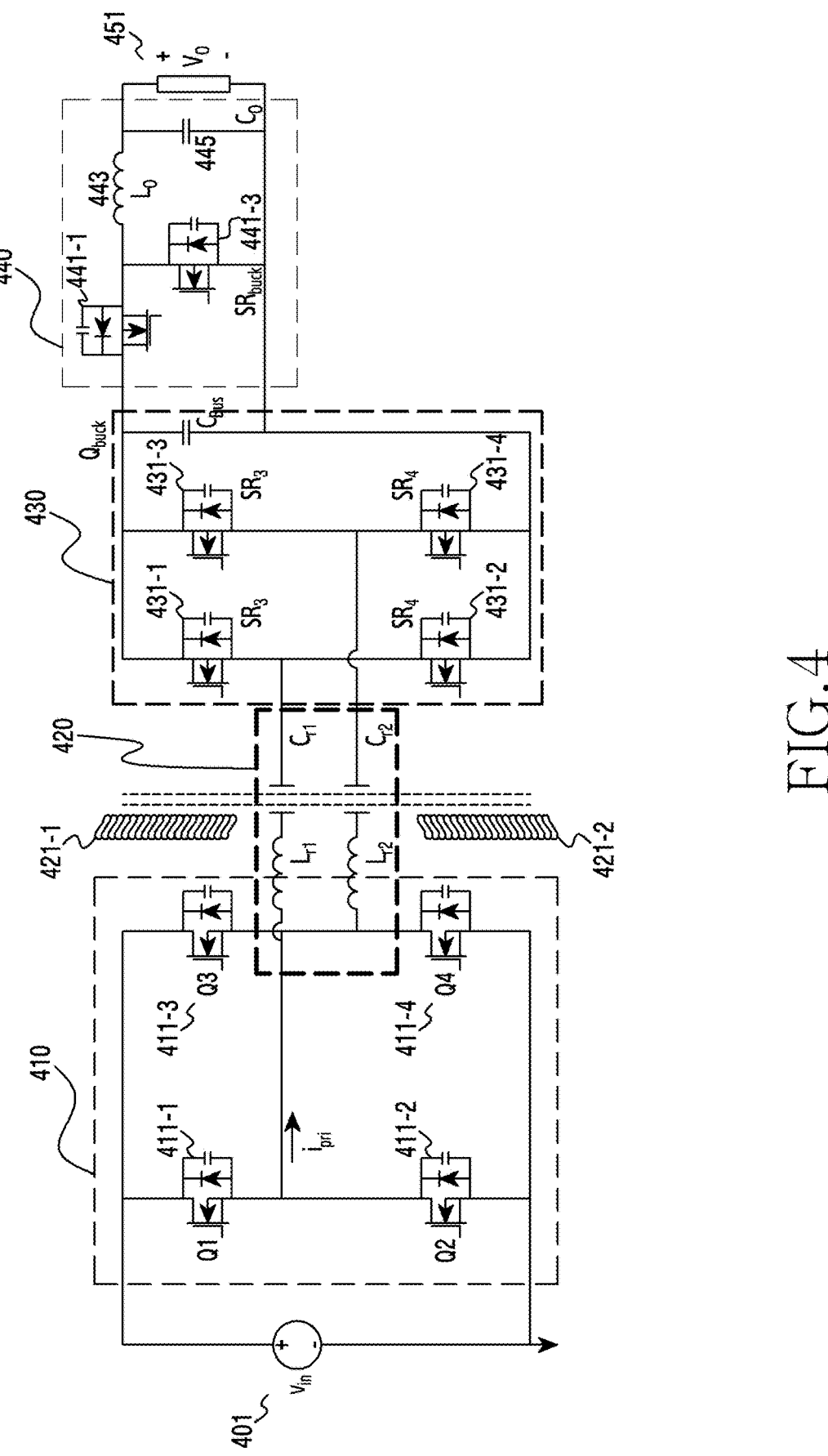
FIG. 4 illustrates an example of configuring a circuit for a constant-magnitude output voltage in a wireless communication system according to an embodiment of the disclosure.

FIG. 4 illustrates an example of configuring a circuit for a constant-magnitude output voltage in a wireless communication system according to an embodiment of the disclosure.

Referring to FIG. 4, an inverter 410 may be an inverter having a full-bridge inverter structure, and may convert an input DC signal into an AC signal to output the AC signal. The DC signal may be supplied to the inverter 410 through a power supply 401. The inverter 410 may include a plurality of switches, and each switch may include a diode and a capacitor. For example, a full-bridge inverter includes four switches 411-1, 411-2, 411-3, and 411-4, and each switch may include a diode and a capacitor. The inverter 410 may be connected to an isolator 420. A voltage corresponding to the input DC signal may be in a range of −36 V to −60 V, which is a voltage range of a general communication system.

The isolator 420 may be a structure that performs isolation, based on a capacitor, and may electrically separate an input side and an output side. According to an embodiment, the capacitor may be an MLCC. For example, the isolator 420 may electrically separate a primary-side isolator and a secondary-side isolator, based on the MLCC. The primary-side isolator may be connected to the inverter 410, and the secondary-side isolator may be connected to a rectifier 430. The isolator 420 may include an inductor and the MLCC. The capacitor may be a multilayer ceramic capacitor (MLCC). Specifically, the isolator 420 may be an MLCC as a type of capacitor, and may electrically separate the primary-side isolator and the secondary-side isolator. According to an embodiment, an isolation standard between the primary-side isolator and the secondary-side isolator may be 1 kV or more.

According to an embodiment, the isolator 420 may form a closed circuit with two MLCCs 421-1 and 421-2. In addition, the MLCCs may be arranged in parallel, and thus a current may be distributed to the MLCCs arranged in parallel. Since the current is distributed to each of the MLCCs arranged in parallel, the amount of heat generation by each component may be reduced, and thus there is no restriction in selecting components when designing a circuit compared to a transformer. Further, a transformer for isolation may be replaced, thereby reducing the size of a printed circuit board (PCB). For example, an additional MLCC may be attached to an existing MLCC, thereby connecting the additional MLCC in parallel. The MLCCs may be connected in parallel, thus reducing a current flowing in each of the MLCCs. Since power loss is proportional to the square of the magnitude of a current, the isolator using the MLCC may reduce the amount of heat generation. When the amount of heat generation is reduced, a component does not need to be designed large in order to reduce the amount of heat generation. Therefore, it is possible to optimize the design of the isolator using the MLCC according to an increase in capacity compared to the transformer, and the size of the isolator may be reduced.

According to an embodiment, the isolator 420 may include the inductor. The inductor may be positioned in the primary-side isolator such that one end of the inductor may be connected to the MLCC and the other end of the inductor may be connected to the inverse converter 410 or the rectifier 430. Specifically, a first inductor may be connected to a first MLCC 421-1, and a second inductor may be connected to a second MLCC 421-2. Through the inductor connected to the MLCC, a resonant frequency may be obtained at a certain frequency. For example, in the MLCC to which the inductor is connected, since a voltage gain is 1 at the resonant frequency, the voltage of the secondary-side isolator may be the same as the voltage of the primary-side isolator. According to an embodiment, the first inductor and the second inductor may have the same size, and the first MLCC 421-1 and the second MLCC 421-2 may have the same size.

The rectifier 430 may be a rectifier having a full-bridge rectifier structure, and may convert an output AC signal into a DC signal to output the DC signal. For example, the rectifier 430 may convert an AC signal output from the secondary-side isolator of the isolator 420 into a DC signal to output the DC signal. The rectifier 430 may include a plurality of switches, and each switch may include a diode and a capacitor. For example, a full-bridge rectifier may include four switches 431-1, 431-2, 431-3, and 431-4, and each switch may include a diode and a capacitor. In addition, the rectifier 430 may include a capacitor $C_{bus}$ for smoothing. Specifically, the rectifier 430 may smooth a signal output from the full-bridge rectifier, based on $C_{bus}$. The rectifier 430 may be connected to a DC-DC converter 440.

The DC-DC converter 440 may be a DC-DC converter having a buck converter structure, and may reduce and output the voltage of an output DC signal. For example, the DC-DC converter 440 may reduce and output the voltage of the DC signal output from the rectifier 430. The DC-DC converter 440 may include a plurality of switches, and each switch may include a diode and a capacitor. For example, a buck converter has two switches 441-1 and 441-3, and each switch may include a diode and a capacitor. In addition, the DC-DC converter 440 may include an inductor 443 and a capacitor 445 for smoothing. The DC-DC converter 440 may smooth a signal output from the full-bridge rectifier. Specifically, the inductor 443 and the capacitor 445 may be connected to one end of the buck converter. Although the disclosure explains that the DC-DC converter 440 reduces and outputs the voltage of the DC signal, the DC-DC converter 440 may increase and output the voltage of the DC signal. For example, the voltage 451 of a DC signal output from the DC-DC converter 440, which corresponds to a constant-magnitude output voltage, may be 28 V or 48 V. When a voltage input to the inverter 410 is lower than 28 V or 48 V, the DC-DC converter 440 may increase and output the voltage accordingly by using a boost or buck-boost converter.

Figure 5A:
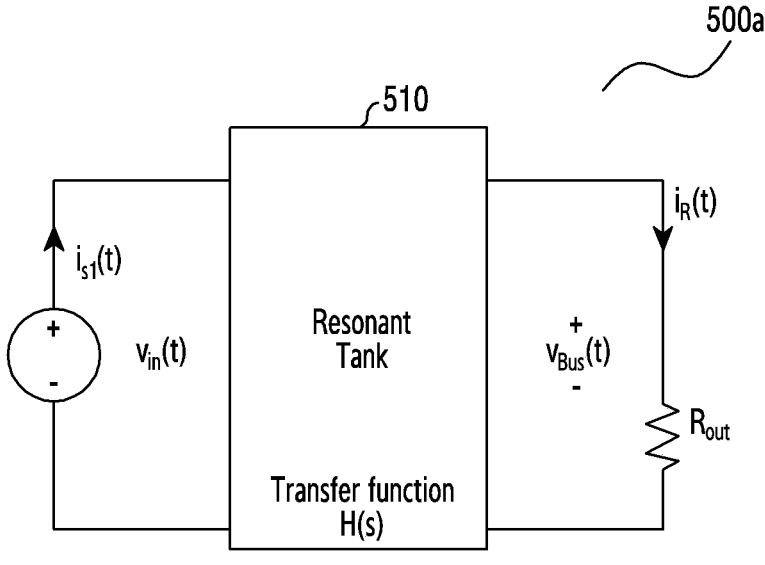
FIGS. 5A and 5B are equivalent circuits illustrating an operation principle of a circuit for a constant-magnitude output voltage in a wireless communication system according to various embodiments of the disclosure.
Figure 5B:
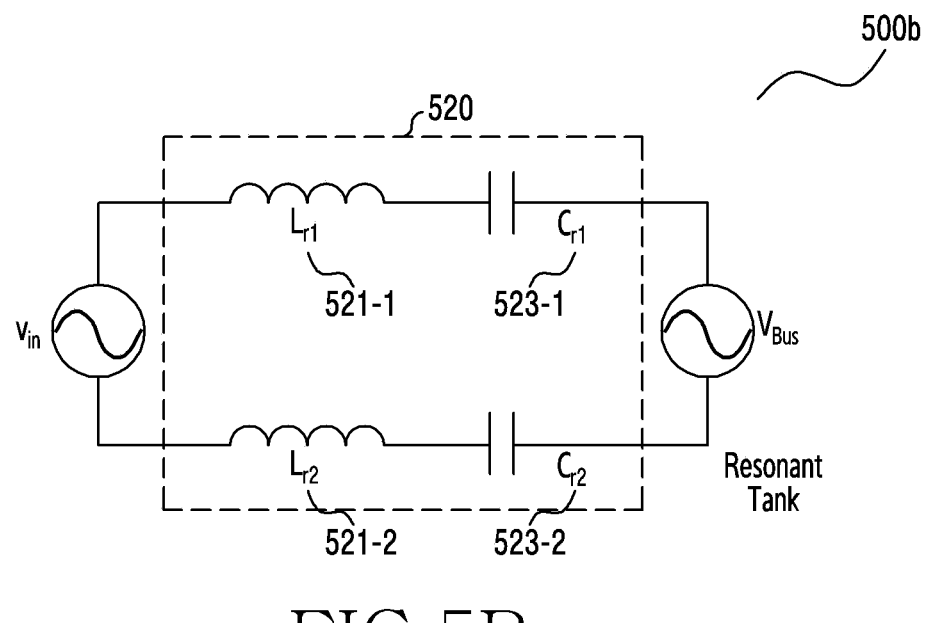

FIGS. 5A and 5B are equivalent circuits illustrating an operation principle of a circuit for a constant-magnitude output voltage in a wireless communication system according to various embodiments of the disclosure.

FIG. 5A is an equivalent circuit using a transfer function in a wireless communication system according to an embodiment of the disclosure.

FIG. 5B is an equivalent circuit using an inductor and a capacitor in a wireless communication system according to an embodiment of the disclosure.

Referring to FIG. 5A, an equivalent circuit of a power circuit that performs isolation by using an MLCC may be shown in the form of a transfer function 510 (500a). The power circuit refers to a circuit for obtaining a constant-magnitude output voltage with respect to a specific input voltage. At a resonance frequency, $v_{bus}(t)$ and $v_{in}(t)$ that have passed through the transfer function may be the same. For example, when the voltage $v_{in}(t)$ corresponding to a signal having the resonant frequency is applied to the inverter 410, $v_{bus}(t)$ and $v_{in}(t)$ may be the same at the resonant frequency.

Referring to FIG. 5B, an equivalent circuit 520 of a power circuit that performs isolation by using an MLCC may be shown with two MLCCs 523-1 and 523-2 and two inductors 521-1 and 521-2 (500b). For example, a capacitor may be an MLCC. According to an embodiment, an inductor 521-1 may be connected to an MLCC 523-1 so that a resonant frequency may be obtained at a specific frequency. According to an embodiment, an inductor 521-2 may be connected to an MLCC 523-2 so that the resonant frequency may be obtained at the specific frequency. For example, in the MLCCs to which the inductors are connected, since a voltage gain is 1 at the resonant frequency, the voltage of a secondary-side isolator may be the same as the voltage of a primary-side isolator. For example, when a voltage $v_{in}(t)$ corresponding to a signal having the resonant frequency is applied to the inverter 410, $v_{bus}(t)$ and $v_{in}(t)$ may be the same at the resonant frequency.

Hereinafter, an input-output relationship equation and a voltage gain according to an operating frequency will be described with reference to FIGS. 6A and 6B.

Figure 6A:
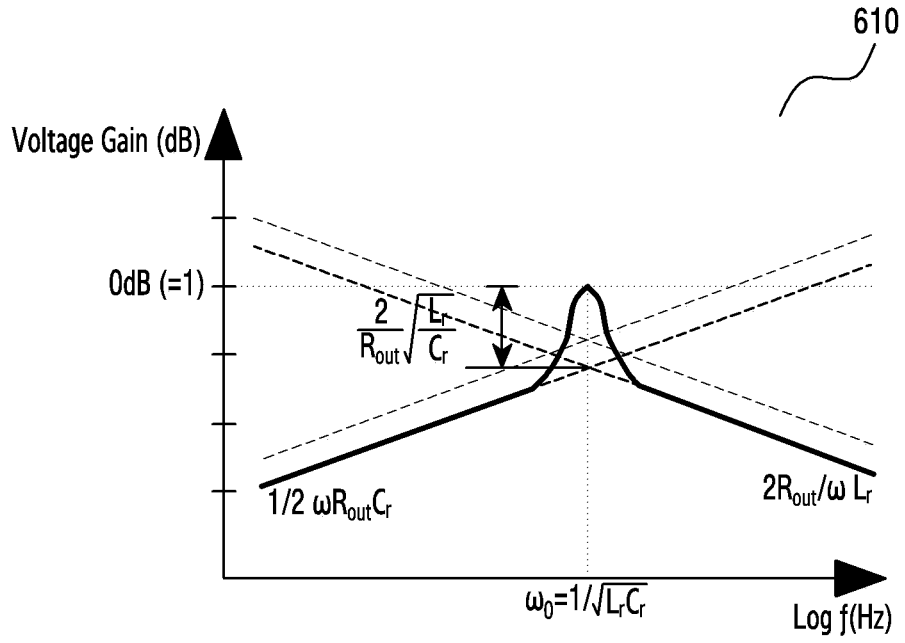
FIGS. 6A and 6B illustrate a voltage gain of a circuit for a constant-magnitude output voltage in a wireless communication system according to various embodiments of the disclosure.
Figure 6B:
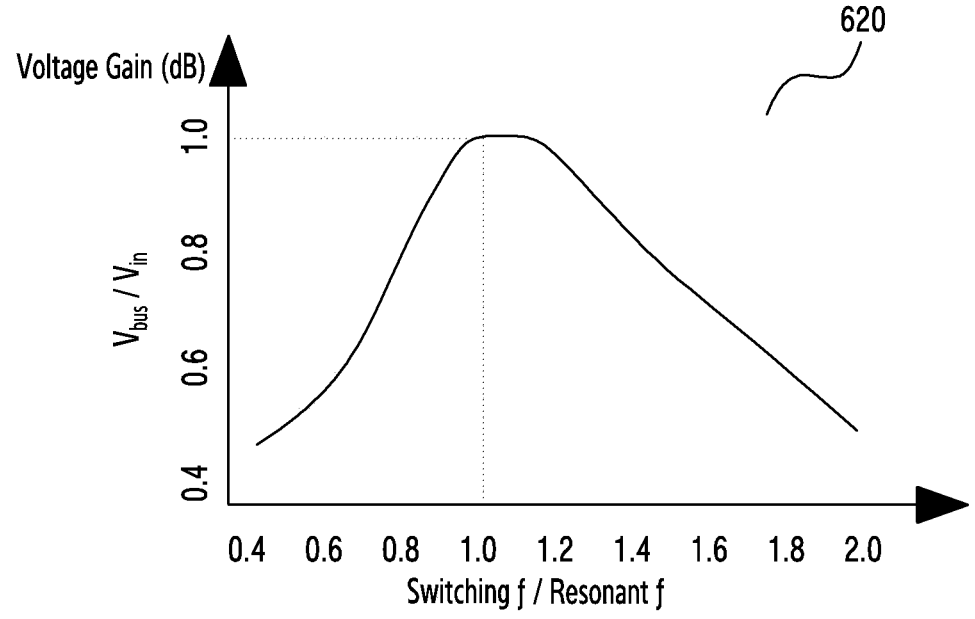

FIGS. 6A and 6B illustrate a voltage gain of a circuit for a constant-magnitude output voltage in a wireless communication system according to various embodiments of the disclosure.

FIG. 6A illustrates a voltage gain of a circuit for a constant-magnitude output voltage in a logarithmic unit in a wireless communication system according to an embodiment of the disclosure.

FIG. 6B illustrates a voltage gain of a circuit for a constant-magnitude output voltage in a wireless communication system according to an embodiment of the disclosure.

Referring to FIG. 6A, the voltage gain of the power circuit may be expressed as a voltage gain in the logarithmic unit according to an operating frequency in the logarithmic unit (610). In FIG. 6A, a horizontal axis denotes the operating frequency (unit: Hz) of the power circuit, and a vertical axis denotes the voltage gain (unit: dB). The power circuit refers to a circuit for obtaining a constant-magnitude output voltage with respect to a specific input voltage. The voltage gain of the power circuit is shown to be the highest when the operating frequency is a resonant frequency $\varphi_0$. For example, when the operating frequency is the resonant frequency, the gain in the logarithmic unit is 0, which indicates that the voltage gain is 1. Further, the voltage gain according to the operating frequency is shown to decrease as the difference between the operating frequency and the resonant frequency $w_o$ increases. For example, when the operating frequency is on the left of the resonant frequency $\varphi_0$, the voltage gain is shown to decrease as the operating frequency approaches 0, and when the operating frequency is on the right of the resonant frequency $w_o$, the voltage gain is shown to decrease as the operating frequency of an input signal increases.

The relationship between the operating frequency and the voltage gain may be determined based on Equation 3. According to an embodiment, a first inductor 521-1 and a second inductor 521-2 may have the same size of $L_r$, and a first MLCC 523-1 and a second MLCC 523-2 may have the same size of $C_r$.

$$\frac{V_{Bus}(s)}{V_{in}(s)} = \qquad\qquad\qquad\qquad \text{Equation 3}$$

$$\frac{R_{out}}{\frac{2}{sC_r} + s2L_r + R_{out}} \rightarrow \left|\frac{V_{Bus}}{V_{in}}\right| = \frac{1}{\sqrt{1 + \frac{4L_r}{R_{out}^2 C_r}\left(\frac{f_0}{f_s} - \frac{f_s}{f_0}\right)^2}}$$

Here, $V_{bus}(s)$ denotes an output voltage, $V_{in}(s)$ denotes an input voltage, $C_r$ denotes the size of a capacitor, $L_r$ denotes the size of an inductor, $R_{out}$ denotes the output voltage, $f_s$ denotes the magnitude of the operating frequency, and $f_o$ denotes the magnitude of the resonant frequency.

Referring to FIG. 6B, the voltage gain of the power circuit may be expressed as a voltage gain according to an operating frequency (620). In FIG. 6B, the horizontal axis denotes the operating frequency/resonant frequency (no unit), and the vertical axis denotes the voltage gain (unit: dB). The voltage gain according to the operating frequency is shown to be the highest when the operating frequency is the resonant frequency. For example, when the operating frequency is the resonant frequency, the gain is 1, which indicates that the voltage gain is 1. Further, the voltage gain according to the operating frequency is shown to decrease as the difference between the operating frequency and the resonant frequency increases. For example, when the operating frequency is on the left of the resonant frequency, the voltage gain is shown to decrease as the frequency approaches 0, and when the operating frequency is on the right of the resonant frequency, the voltage gain is shown to decrease as the operating frequency increases.

Figure 7:
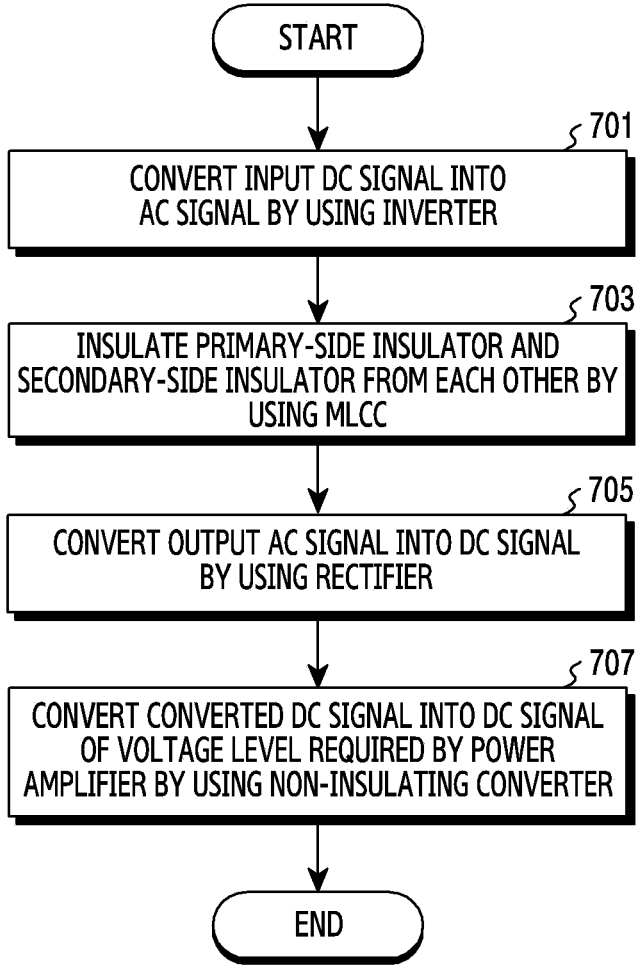
FIG. 7 is a flowchart illustrating a circuit for a constant-magnitude output voltage in a wireless communication system according to an embodiment of the disclosure.

FIG. 7 is a flowchart illustrating a circuit for a constant-magnitude output voltage in a wireless communication system according to an embodiment of the disclosure.

Referring to FIG. 7, in operation 701, an input DC signal may be converted into an AC signal by using an inverter 410. For example, the inverter 410 may have a full-bridge structure, so the inverter 410 may be also called a full-bridge inverter 410. For example, a full-bridge inverter 410 may include four switches 411-1, 411-2, 411-3, and 411-4, and each switch may include a diode and a capacitor. An inverter 410 may be connected to an isolator 420. A voltage corresponding to the input DC signal may be in a range of −36V to −60V, which is a voltage range of a general communication system.

In operation 703, a primary-side isolator and a secondary-side isolator may be isolated from each other by using an MLCC. Isolation refers to electrically separating an input side and an output side. For example, the primary-side isolator and the secondary-side isolator may be electrically separated based on the MLCC.

According to an embodiment, a closed circuit may be formed with two MLCCs. The MLCCs may be arranged in parallel, and thus a current may be distributed to the MLCCs arranged in parallel. Since the current is distributed to the MLCCs arranged in parallel, the size of a printed circuit board (PCB) may be reduced. For example, an additional MLCC may be attached to an existing MLCC, thereby connecting the additional MLCC in parallel. The MLCCs may be connected in parallel, thus reducing a current flowing in each of the MLCCs. Since power loss is proportional to the square of the magnitude of a current, the isolator using the MLCC may reduce the amount of heat generation due to a current distribution effect. When the amount of heat generation is reduced, a component does not need to be designed large in order to reduce the amount of heat generation. Therefore, the isolator using the MLCC may not only replace a transformer but also enable the size of the printed circuit board (PCB) to be reduced compared to a case where a transformer is used.

According to an embodiment, an inductor may be positioned in the primary-side isolator such that one end of the inductor may be connected to the MLCC and the other end of the inductor may be connected to a rectifier 430 or inverter 410 end. Specifically, a first inductor may be connected to a first MLCC, and a second inductor may be connected to a second MLCC. Through the inductor connected to the MLCC, a resonant frequency may be obtained at a certain frequency. For example, in the MLCC to which the inductor is connected, since a voltage gain is 1 at the resonant frequency, the voltage of the secondary-side isolator may be the same as the voltage of the primary-side isolator. According to an embodiment, the first inductor and the second inductor may have the same size, and the first MLCC and the second MLCC may have the same size.

In operation 705, the output AC signal may be converted into a DC signal by using a rectifier 430. For example, the rectifier 430 may have a full-bridge structure, so the inverter 410 may be also called a full-bridge rectifier 430. For example, a full-bridge rectifier 430 may include four switches 431-1, 431-2, 431-3, and 431-4, and each switch may include a diode and a capacitor. In addition, the full-bridge rectifier 430 may include a capacitor for smoothing. Specifically, the full-bridge rectifier 430 may smooth a signal output from the full-bridge rectifier 430, based on the capacitor.

In operation 707, the converted DC signal may be converted into a DC signal of a voltage level required by a power amplifier by using a non-isolated converter. For example, the non-isolating converter may be one of a buck converter, a boost converter, or a buck-booster converter. According to an embodiment, a buck converter may be connected to the full-bridge rectifier 430. The voltage of the output DC signal may be reduced and outputted by using the connected buck converter. For example, the voltage of the DC signal output from the full-bridge rectifier 430 may be reduced. The buck converter may include two switches, and each switch may include a diode and a capacitor. In addition, the buck converter may include an inductor and a capacitor for smoothing. A DC-DC converter may smooth a signal output from the full-bridge rectifier 430. Specifically, the inductor and the capacitor may be connected to one end of the buck converter. Although the disclosure explains that the buck converter reduces and outputs the voltage of the DC signal, the voltage of the DC signal may be increased and output by using a different DC-DC converter instead of the buck converter. For example, the voltage of a DC signal output from the DC-DC converter, which corresponds to a constant-magnitude output voltage, may be 28 V or 48 V. When a voltage input to the full-bridge inverter 410 is lower than 28 V or 48 V, the voltage may be increased and output accordingly by using a boost or buck-boost converter.

Figure 8A:
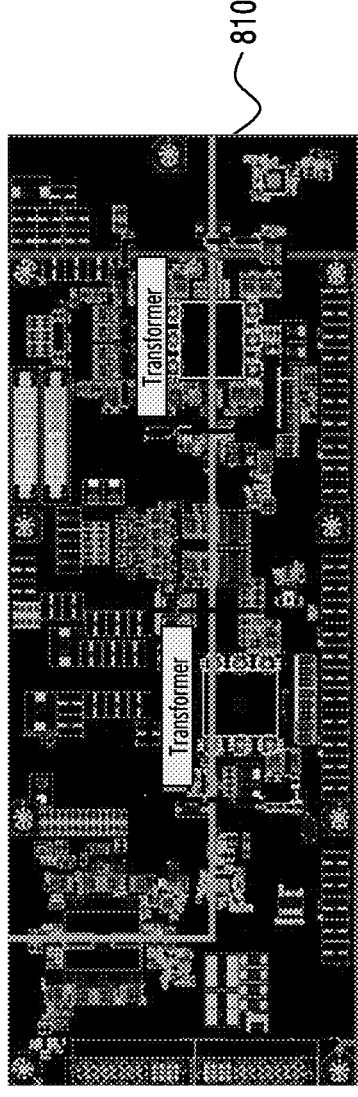
FIGS. 8A and 8B illustrate examples of a component arrangement in a circuit for a constant-magnitude output voltage in a wireless communication system according to various embodiments of the disclosure.
Figure 8B:
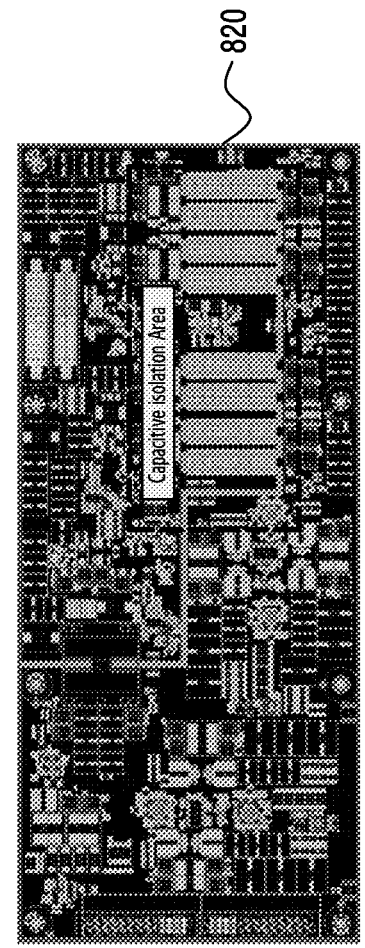

FIGS. 8A and 8B illustrate examples of a component arrangement in a circuit for a constant-magnitude output voltage in a wireless communication system according to various embodiments of the disclosure.

FIG. 8A illustrates an example of a component arrangement in a circuit for a constant-magnitude output voltage, based on a transformer, in a wireless communication system according to an embodiment of the disclosure.

FIG. 8B illustrates an example of a component arrangement in a circuit for a constant-magnitude output voltage, based on an MLCC, in a wireless communication system according to an embodiment of the disclosure.

Referring to FIG. 8A, the transformer is disposed in the middle of a printed circuit board (PCB) (810). The PCB may be a double-sided PCB. For example, the transformer may be disposed on the double-sided PCB. In a power circuit in which the transformer is disposed, the maximum height of the power circuit may be 18 mm or more, which is the height of the transformer. The size of the double-sided PCB on which the transformer is disposed may be 320 mm in width and 120 mm in length.

Referring to FIG. 8B, like the transformer, the MLCC is disposed in the middle of a PCB 820. For example, the MLCC may be disposed on a single-sided PCB. Specifically, in a power circuit in which the MLCC is disposed, since the height of the MLCC is 2.5 mm, which is low, the maximum height may be determined as 13 mm, which is the height of a series inductor. The size of the single-sided PCB on which the MLCC is disposed may be 280 mm wide and 120 mm in length.

Figure 9A:
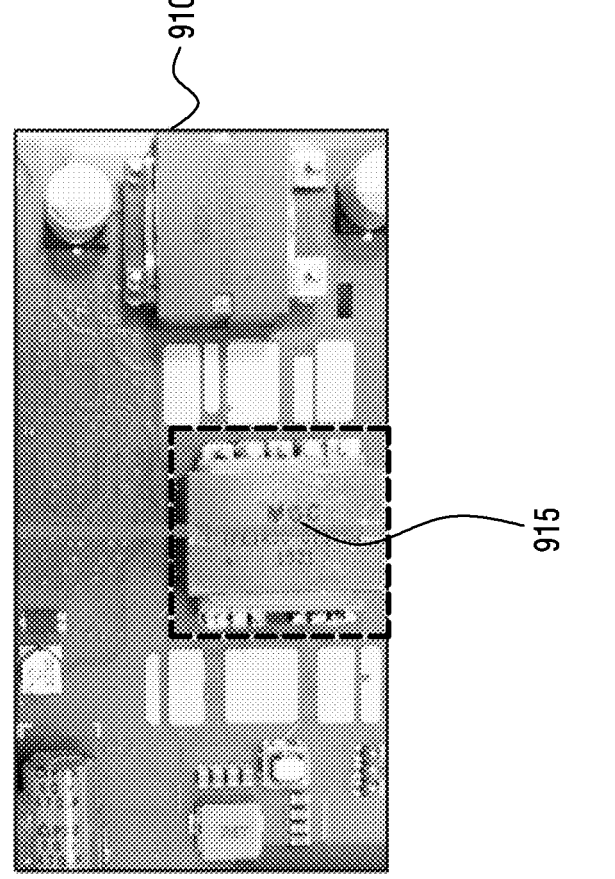
FIGS. 9A, 9B, and 9C illustrate different examples of a component arrangement in a circuit for a constant-magnitude output voltage in a wireless communication system according to various embodiments of the disclosure.
Figure 9B:
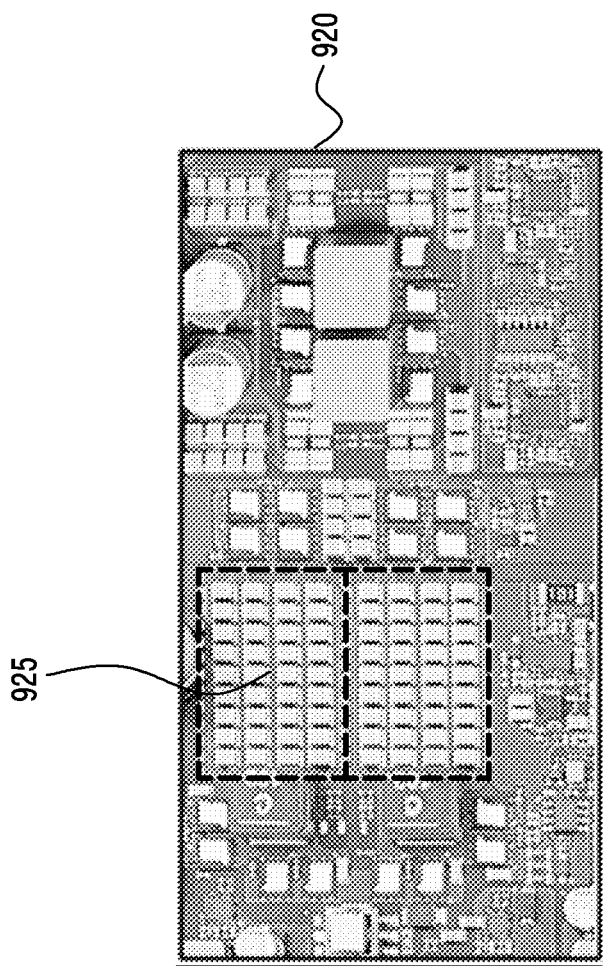
Figure 9C:
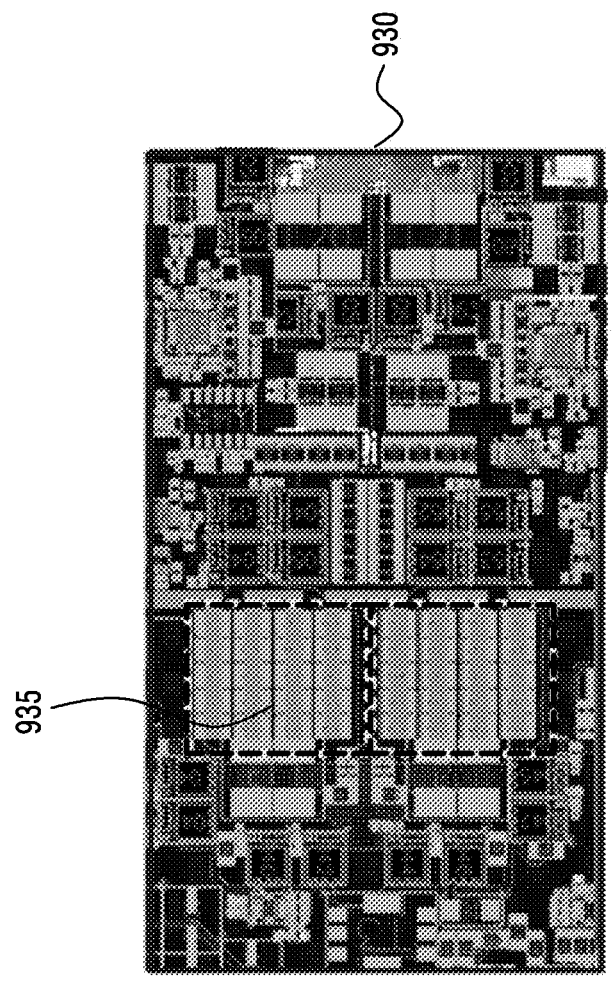

FIGS. 9A to 9C illustrate different examples of a component arrangement in a circuit for a constant-magnitude output voltage in a wireless communication system according to various embodiments of the disclosure.

FIG. 9A illustrates another example of a component arrangement in a circuit for a constant-magnitude output voltage, based on a transformer, in a wireless communication system according to an embodiment of the disclosure.

FIG. 9B illustrates another example of a component arrangement in a circuit for a constant-magnitude output voltage, based on an MLCC, in a wireless communication system according to an embodiment of the disclosure.

FIG. 9C illustrates still another example of a component arrangement in a circuit for a constant-magnitude output voltage, based on an MLCC, in a wireless communication system according to an embodiment of the disclosure.

Referring to FIG. 9A, the transformer 915 is disposed in the middle of a printed circuit board (PCB) (910). The PCB may be a double-sided PCB. According to an embodiment, the transformer 915 may be disposed on the double-sided PCB. Specifically, the transformer 915 may be disposed in an area indicated by a dotted line on the double-sided PCB. According to an embodiment, a power circuit in which the transformer 915 is disposed may have a maximum height of 16.5 mm, which is the height of the used transformer 915. According to an embodiment, the size of the double-sided PCB on which the transformer 915 is disposed may be 120 mm in width and 60 mm in length. According to an embodiment, the weight of the power circuit in which the transformer 915 is disposed may be 140 g.

Referring to FIG. 9B, the MLCC 925 is disposed in the middle of the PCB (920). The PCB may be a single-sided PCB. According to an embodiment, the MLCC may be disposed on the single-sided PCB. Specifically, the MLCC 925 may be disposed in an area indicated by a dotted line on the single-sided PCB. According to an embodiment, in a power circuit in which the MLCC is disposed, since the height of the MLCC 925 is 2.5 mm, which is low, the maximum height may be determined as 13 mm, which is the height of a series inductor. According to an embodiment, the size of the single-sided PCB on which the MLCC 925 is disposed may be 125 mm in width and 65 mm in length. According to an embodiment, the area of the single-sided PCB on which the MLCC 925 is disposed may be reduced by approximately 13% of the area of the single-sided PCB on which the transformer is disposed.

Referring to FIG. 9C, the MLCC 935 is disposed in the middle of a PCB (930). The PCB may be a double-sided PCB. According to an embodiment, the MLCC 935 may be disposed on the double-sided PCB. Specifically, the MLCC 935 may be disposed in an area indicated by a dotted line on the double-sided PCB. According to an embodiment, in the height of the double-sided PCB on which the MLCC 935 is disposed, the height of the MLCC 935 itself is 2.5 mm, thus minimizing an increase in height due to a double-sided arrangement. According to an embodiment, the size of the double-sided PCB on which the MLCC 935 is disposed may be 100 mm in width and 55 mm in length. According to an embodiment, the area of the double-sided PCB on which the MLCC 935 is disposed may be reduced by approximately 24.6% of the area of the double-sided PCB on which the transformer is disposed.

According to various embodiments of the disclosure, an apparatus in a wireless communication system may include a full-bridge inverter configured to convert an input first DC signal into a first AC signal, a plurality of multilayer ceramic capacitors (MLCCs) configured to isolate the first AC signal output from the full-bridge inverter to output a second AC signal, and a full-bridge rectifier configured to convert the second AC signal output from the plurality of MLCCs into a second DC signal, wherein the plurality of MLCCs may isolate the full-bridge inverter from the full-bridge rectifier, an inductor may be connected to one end of each of the plurality of MLCCs, and an operating frequency of the first AC signal may correspond to a resonant frequency of an isolator.

According to an embodiment, the plurality of MLCCs may include a first MLCC and a second MLCC, and a capacitance value of the first MLCC and a capacitance value of the second MLCC may have a same capacitance value.

According to an embodiment, the apparatus may include a first inductor connected to the first MLCC and a second inductor connected to the second MLCC, and an inductance value of the first inductor and an inductance value of the second inductor may have a same inductance value.

According to an embodiment, the apparatus may further include a DC to DC (DC-DC) converter configured to be connected to the full-bridge rectifier and to convert the second DC signal output from the full-bridge rectifier into a third DC signal.

According to an embodiment, the DC-DC converter may be a buck, boost, or buck-boost converter.

According to an embodiment, each of the plurality of MLCCs may satisfy an isolation standard of 1 kV.

According to an embodiment, a voltage corresponding to the first DC signal may be in a range of −36 V to −60 V, which is a voltage range of a general communication system.

According to an embodiment, a voltage corresponding to the third DC signal may be one of 28 V or 48 V depending on an element used in a power amplifier.

According to an embodiment, an additional MLCC having a same size as the first MLCC may be attached to the first MLCC, and an additional MLCC having a same size as the second MLCC may be attached to the second MLCC.

According to an embodiment, the additional MLCC attached to the first MLCC and the first MLCC may be configured in parallel, and the additional MLCC attached to the second MLCC and the second MLCC may be configured in parallel.

According to an embodiment, the full-bridge inverter comprises a plurality of switches, and each of the plurality of switches comprises at least one of a diode and a capacitor.

According to an embodiment, the inductor is connected to the MLCC for the resonant frequency.

According to an embodiment, a voltage gain is 1 at the resonant frequency.

According to an embodiment, the apparatus may further include a smoothing capacitor configured to smooth a signal output from the full-bridge rectifier.

According to various embodiments of the disclosure, a method in a wireless communication system may include converting an input first DC signal into a first AC signal, based on a full-bridge inverter, isolating the first AC signal output from the full-bridge inverter to output a second AC signal, based on a plurality of multilayer ceramic capacitors (MLCCs), and converting the second AC signal output from the plurality of MLCCs into a second DC signal, based on a full-bridge rectifier, wherein the plurality of MLCCs may isolate the full-bridge inverter from the full-bridge rectifier, an inductor may be connected to one end of each of the plurality of MLCCs, and an operating frequency of the first AC signal may correspond to a resonant frequency.

According to an embodiment, the plurality of MLCCs may include a first MLCC and a second MLCC, and a capacitance value of the first MLCC and a capacitance value of the second MLCC may have a same capacitance value.

According to an embodiment, a first inductor may be connected to the first MLCC and a second inductor may be connected to the second MLCC, and an inductance value of the first inductor and an inductance value of the second inductor may have a same inductance value.

According to an embodiment, the method may further include converting the second DC signal output from the full-bridge rectifier into a third DC signal, based on a DC-DC converter.

According to an embodiment, the DC-DC converter may be a buck, boost, or buck-boost converter.

According to an embodiment, each of the plurality of MLCC may satisfy an isolation standard of 1 kV.

According to an embodiment, a voltage corresponding to the first DC signal may be in a range of −36 V to −60 V, which is a voltage range of a general communication system.

According to an embodiment, a voltage corresponding to the third DC signal may be one of 28 V or 48 V depending on an element used in a power amplifier.

According to an embodiment, an additional MLCC having a same size as the first MLCC may be attached to the first MLCC, and an additional MLCC having a same size as the second MLCC may be attached to the second MLCC.

According to an embodiment, the additional MLCC attached to the first MLCC and the first MLCC may be configured in parallel, and the additional MLCC attached to the second MLCC and the second MLCC may be configured in parallel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus in a wireless communication system, the apparatus comprising:

a power amplifier; and a circuitry coupled with the power amplifier, wherein the circuitry includes:

a full-bridge inverter configured to convert an input first direct current (DC) signal into a first alternating current (AC) signal, a plurality of multilayer ceramic capacitors (MLCCs) configured to isolate the first AC signal output from the full-bridge inverter to output a second AC signal; and a full-bridge rectifier configured to convert the second AC signal output from the plurality of MLCCs into a second DC signal, wherein the plurality of MLCCs isolate the full-bridge inverter from the full-bridge rectifier and are arranged in parallel to distribute current flow, wherein each of a plurality of inductors is connected to one end of each of the plurality of MLCCs for a resonant frequency, and wherein an operating frequency of the first AC signal corresponds to the resonant frequency.

2. The apparatus of claim 1, wherein the plurality of MLCCs comprise a first MLCC and a second MLCC, and wherein a capacitance value of the first MLCC and a capacitance value of the second MLCC have a same capacitance value.

3. The apparatus of claim 2, further comprising:

a first inductor connected to the first MLCC and a second inductor connected to the second MLCC, wherein an inductance value of the first inductor and an inductance value of the second inductor have a same inductance value.

4. The apparatus of claim 2, wherein an additional MLCC having a same size as the first MLCC is attached to the first MLCC, and wherein an additional MLCC having a same size as the second MLCC is attached to the second MLCC.

5. The apparatus of claim 4, wherein the additional MLCC attached to the first MLCC and the first MLCC are configured in parallel, and wherein the additional MLCC attached to the second MLCC and the second MLCC are configured in parallel.

6. The apparatus of claim 1, further comprising:

a DC to DC (DC-DC) converter configured to be connected to the full-bridge rectifier and to convert the second DC signal output from the full-bridge rectifier into a third DC signal, wherein the third DC signal is based on a voltage level required from the power amplifier.

7. The apparatus of claim 6, wherein the DC-DC converter is a buck, boost, or buck-boost converter.

8. The apparatus of claim 6, wherein a voltage corresponding to the third DC signal is one of 28 V or 48 V depending on an element used in a power amplifier.

9. The apparatus of claim 1, wherein each of the plurality of MLCCs satisfies an isolation standard of 1 kV.

10. The apparatus of claim 1, wherein a voltage corresponding to the first DC signal ranges from −36 V to −60 V.

11. The apparatus of claim 1, wherein the full-bridge inverter comprises a plurality of switches, and wherein each of the plurality of switches comprises at least one of a diode and a capacitor.

12. The apparatus of claim 1, wherein a voltage gain is 1 at the resonant frequency.

13. The apparatus of claim 1, further comprising a smoothing capacitor configured to smooth a signal output from the full-bridge rectifier.

14. A method performed by an apparatus in a wireless communication system, the method comprising:

converting an input first direct current (DC) signal into a first alternating current (AC) signal, based on a full-bridge inverter;

isolating the first AC signal output from the full-bridge inverter to output a second AC signal, based on a plurality of multilayer ceramic capacitors (MLCCs); and converting the second AC signal output from the plurality of MLCCs into a second DC signal, based on a full-bridge rectifier, wherein the plurality of MLCCs isolate the full-bridge inverter from the full-bridge rectifier and are arranged in parallel to distribute current flow, wherein each of a plurality of inductors is connected to one end of each of the plurality of MLCCs for a resonant frequency, and wherein an operating frequency of the first AC signal corresponds to the resonant frequency.

15. The method of claim 14, wherein the plurality of MLCCs comprise a first MLCC and a second MLCC, and wherein a capacitance value of the first MLCC and a capacitance value of the second MLCC have a same capacitance value.

16. The method of claim 15, wherein a first inductor is connected to the first MLCC and a second inductor is connected to the second MLCC; and wherein an inductance value of the first inductor and an inductance value of the second inductor have a same inductance value.

17. The method of claim 14, further comprising:

converting the second DC signal output from the full-bridge rectifier into a third DC signal, based on a DC to DC (DC-DC) converter, wherein the third DC signal is based on a voltage level required from a power amplifier.

18. The method of claim 17, wherein the DC-DC converter is a buck, boost, or buck-boost converter.

19. The method of claim 14, wherein each of the plurality of MLCCs satisfies an isolation standard of 1 kV.

* * * * *